United States Patent [19]

Wegehaupt

[11] Patent Number: 4,720,313
[45] Date of Patent: Jan. 19, 1988

[54] HYDRAULIC TIRE REPAIR METHOD

[75] Inventor: Robert F. Wegehaupt, Murfreesboro, Tenn.

[73] Assignee: Perfect Equipment Corp., Murfreesboro, Tenn.

[21] Appl. No.: 729,673

[22] Filed: May 2, 1985

[51] Int. Cl.⁴ .................. B60C 21/02; B60C 25/16; B29C 35/04

[52] U.S. Cl. .................. 156/97; 156/156; 156/293; 156/323; 264/36; 264/314; 425/14; 425/27

[58] Field of Search .................. 156/95–98, 156/156, 293, 294, 323, 909, 115; 152/367, 559; 264/36, 314, 315, 326, 516, 570, 573; 425/11, 14, 15, 16, 20, 23, 26, 27; 81/15.2, 15.5, 15.6, 15.7

[56] References Cited

U.S. PATENT DOCUMENTS

| | | | |
|---|---|---|---|
| 2,611,152 | 9/1952 | Seifried | 264/315 X |
| 2,782,462 | 2/1957 | Krug | 264/315 X |
| 3,541,644 | 11/1970 | Lejune | 425/27 |
| 3,940,463 | 2/1976 | Nicholson | 264/36 |
| 4,434,018 | 2/1984 | Brewer | 156/96 |

Primary Examiner—Donald E. Czaja
Assistant Examiner—Thomas Bokan
Attorney, Agent, or Firm—Harrington A. Lackey

[57] ABSTRACT

A method and apparatus for vulcanizing a rubber repair patch on a tire incorporating an internal fluid pressure bag placed within the interior of the tire and against the patch, an inflatable mandrel within the tire and against the internal bag, an external fluid pressure bag engaging the exterior of the tire radially opposite the internal bag, and a retainer device, such as a retainer strap radially encircling and engaging the external bag and the mandrel to cause the internal and external bags to be forced toward each other to squeeze the patch and tire between them, upon inflation of the mandrel.

This invention is paticularly characterized in utilizing internal and external fluid pressure bags having walls of two-dimensional flexibility and utilizing a heat-conductive hydraulic fluid within both bags having a boiling point greater than the vulcanizing temperature.

7 Claims, 3 Drawing Figures

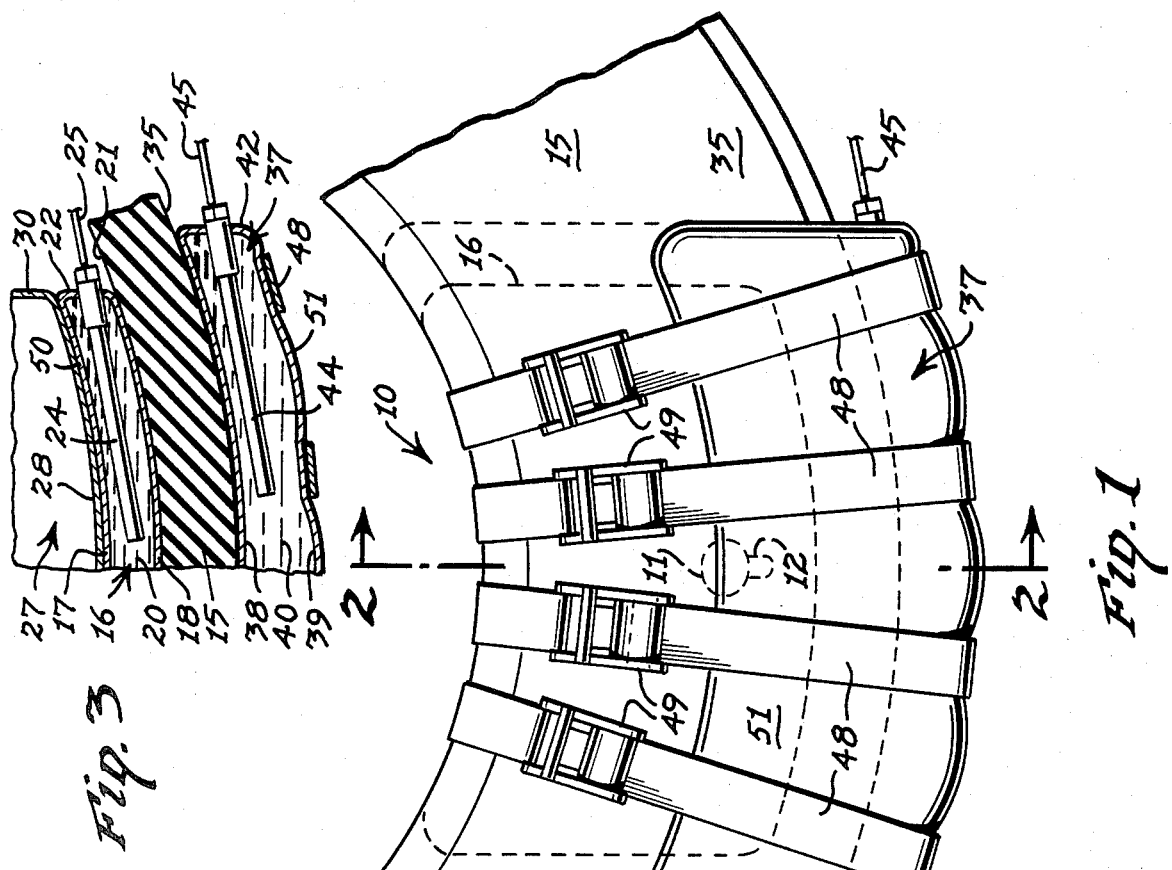
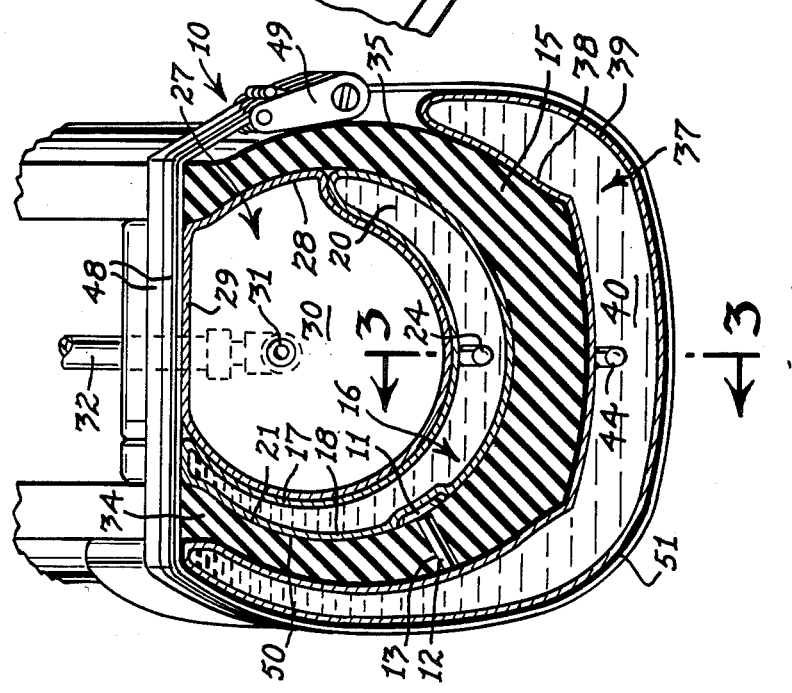

HYDRAULIC TIRE REPAIR METHOD

BACKGROUND OF THE INVENTION

This invention relates to a method and apparatus for the repair of tires, and more particularly to a method and apparatus for vulcanizing a repair patch on a tire.

In the repair of injured tires, whether bias-ply or radial, in which unvulcanized rubber patch material is used, various methods are employed to vulcanize the patch material to the injured area of the tire.

In some vulcanizing processes, a mold apparatus is utilized utilizing heat pads and air bags for applying heat to the rubber patch material.

In one process, a heated mandrel of solid material, such as metal, pre-shaped to fit the interior of the tire, is inserted within the tire. An external heat pad is placed against the exterior of the tire, and then an external air bag is placed against the external heat pad. The assembly is then placed within a solid mold and heat is applied to the solid mandrel in order to heat the patch material to a vulcanizing temperature.

In another form of the mold vulcanizing process, an internal heat pad may be placed against the patch material and the surrounding tire area and an inflatable mandrel or inflatable air bag placed within the tire. When the mandrel or air bag is inflated, pressure is applied against the internal heat pad. An external heat pad and an external air bag are retained against the exterior of the tire within the mold cavity of the mold apparatus, while the internal air bag or inflatable mandrel is clamped in place within the tire.

In one form of the mold vulcanization process, an inner tube has been substituted for the inflatable air bag mandrel for exerting pressure against the inside heat pad.

In all of the above mold vulcanization processes, both the external heat pad and the internal heat pad, although having some cross-sectional curvature, are made of solid rubber encasing the electrical heating coils and therefore have limited flexibility. Accordingly, when the heat pads are placed against the interior or the exterior surface of the tire, the heat pads are not flush with the corresponding surfaces of the tire. Since the tire curves in both its radial dimension and its circumferential dimension, the heat pads, although conforming to the shape to some degree in one dimension, do not conform to the shape in both dimensions of the tire. Accordingly, the heat pad bridges certain areas of the tire surfaces to create air gaps, and the heat is applied unevenly to the corresponding surfaces of the tire, creating localized hot spots.

Furthermore, because of the relative inflexibility of the conventional heat pads, they are not readily adaptable to fit tires of different sizes and shapes to compound the problem of even heat distribution to the repair area as well as the surrounding tire surfaces. Moreover, the relatively stiff heat pads cause distortions in the tire shape during the vulcanization process.

Because the patch on the interior surface of a tire projects inwardly beyond the plane of the tire surface, a rigid mandrel made of metal, or relatively inflexible heat pads, when applied to the interior surface of the injured area, creates uneven pressure against the raised patch and the surrounding tire surface, since the plane of the inner surface of the patch is not flush with the surrounding interior surface of the tire.

Examples of such mold apparatus are the Vulcan section repair molds manufactured and distributed by Vulcan Equipment Company, Limited, of Scarborough, Ontario, Canada.

Another disadvantage of the above mold-type repair apparatus is that the tire repairs have to be made at sites in which the tire mold apparatus is located, and field repairs would be highly impractical and expensive.

Another process of vulcanizing tire repairs, which can be accomplished in the field is the Monarch vulcanizing repair system produced by IMC (Engineers) Ltd., of Hartfordshire, England, and distributed in the United States. This system substitutes flexible, but inelastic, straps for the mold hardware for encircling the section of the tire to be repaired and for containing the exterior and interior heat pads, exterior and interior flat air bags and an inflatable mandrel fitted within the tire. The mandrel is inflated to exert pressure against the interior flat air bag and the interior heat pad, in a somewhat similar manner as the above-described processes incorporating the mold apparatus.

SUMMARY OF THE INVENTION

It is therefore an object of this invention to provide a tire repair vulcanizing system which will apply heat uniformly to the unvulcanized tire repair material, as well as to the surrounding surface of the tire, which will not distort the shape of the tire, regardless of different sizes, and which can easily and quickly be utilized in the field.

Although in this process of vulcanizing the tire repair material, an inflatable mandrel is utilized, nevertheless, the conventional heat pads and air bags have been eliminated.

In this process, an internal fluid pressure bag, encapsulating a hydraulic fluid having a boiling point greater than the operating vulcanizing temperature, is utilized within the tire. The bag walls have two-dimensional flexibility. The internal fluid bag is preferably pre-molded to generally fit the contour of the interior of the tire to be repaired. An inflatable mandrel or air bag is fitted within the tire against the internal fluid bag to force the bag against the interior surface of the tire, when the mandrel is inflated. An external fluid pressure bag, of the same construction as the internal fluid bag and also encapsulating hydraulic fluid, is pre-molded to fit around and against the exterior surface of the tire in radial opposition to the internal bag. Both fluid pressure bags preferably incorporate heating elements within the bags and in contact with the hydraulic fluid.

Flexible, but inelastic retainer straps, such as Nylon straps, encircle the tire and engage the exterior surface of the external fluid bag as well as the top portion of the inflatable mandrel, and are secured taut in operative position.

Therefore, the only additional equipment needed for properly vulcanizing the repair patch material in a tire in accordance with this invention, is a source of energy, such as electricity, for energizing the heater elements within the fluid pressure bags, and a source of compressed air for inflating the inflatable mandrel.

When the mandrel is inflated, its inward expansion toward the center of the tire is restrained by the retainer straps, while the mandrel exerts pressure radially outward against the internal fluid pressure bag, causing the heated hydraulic fluid to distribute itself throughout the fluid pressure bag and against the interior surface of the tire. Simultaneously, the exertion of the inflating mandrel against the retainer straps causes the pressure within the mandrel to be transmitted through the retainer straps to the exterior surface of the external fluid pressure bag, forcing the hot fluid and the bag tightly against the exterior surface of the tire.

Because of the two-dimensional flexibility of the bag walls and the mobility of the heated hydraulic fluid, an even distribution of heat is applied to the corresponding surfaces of the tire as well as the patch material, and furthermore, the shape of the tire is not distorted.

BRIEF DESCRIPTION OF THE DRAWINGS

FIG. 1 is a fragmentary side elevation of the apparatus made in accordance with this invention, in operative position upon a tire, shown fragmentarily, having rubber patch material, shown in phantom;

FIG. 2 is a fragmentary section taken along the line 2-2 of FIG. 1; and

FIG. 3 is an enlarged fragmentary section taken along the line 3—3 of FIG. 2.

DESCRIPTION OF THE PREFERRED EMBODIMENTS

Referring now to the drawings in more detail, an apparatus 10 for vulcanizing patch material, such as the unvulcanized rubber patch 11 and plug 12 installed within the hole 13 of the injured area of a conventional vehicle tire 15, is disclosed in FIGS. 1 and 2.

The apparatus 10 includes an internal fluid pressure bag 16 having an interior wall 17 and an exterior wall 18 and adapted to completely enclose or encapsulate a hydraulic fluid 20 (FIG. 3). The internal bag 16, is preferably pre-formed or molded so that the interior and exterior walls 17 and 18 are curved in radial cross-section to generally the same curvature as the interior surface 21 of the tire 15. The length of the internal bag 16 is immaterial, so long as the bag 16 is long enough, that is in the circumferential dimension of the tire 15, to adequately cover the injured area including the unvulcanized repair patch 11. In a typical truck tire 15, the length of the bag 16 may be in the order of 15". The width of the bag 16 may be less than the curvilinear distance from bead-to-bead around the interior surface 21 of and in the radial plane of the tire 15, so that the internal fluid bag 16 may accommodate itself to the shape of the interior surface 21 of tires of different sizes and still fit flush against the tire interior surface 21.

Projecting through one end wall 22 of the internal fluid bag 16 is an elongated heater element, such as the electrical heater cartridge 24, of conventional construction. The end of the cartridge 24 is sealed in the end wall 22 and is connected by an electrical line 25 to a source of electricity. The cartridge 24 is preferably provided with a thermostat, not shown, in order to control the temperature of the cartridge 24, as well as the heated hydraulic fluid 20.

Also fitted within the interior of the tire 15, and within, and in flush engagement with, the internal fluid pressure bag 16, is an inflatable air bag, or mandrel 27, generally cylindrical in cross-section and having an exterior wall portion 28, an interior wall portion 29, and opposed end walls 30. In one of the end walls 30, is located an air valve 31 connected to an air hose 32, (FIG. 2). The hose 32, is connected to a source of compressed air, not shown.

The mandrel 27 is designed so that its exterior wall portion 28 will preferably be in flush engagement with the interior wall 17 of the internal bag 16. Moreover, the height or radial extent of the inflatable mandrel 27 is such that the interior wall portion 29 preferably projects radially inward toward the center of the tire 15 and slightly beyond the bead area 34 of the tire 15, when the mandrel 27 is inflated, as illustrated in FIG. 2.

Fitted around the exterior surface 35 of the tire 15, is an external fluid pressure bag 37 having a radial interior wall 38 and a radial exterior wall 39 and adapted to completely encapsulate the hydraulic fluid 40, which is identical to the hydraulic fluid 20. The walls 38 and 39 are preferably pre-formed to the general transverse curvature of the exterior surface 35 of the tire 15, as illustrated in FIG. 2. The external bag 37 is also preferably pre-molded or pre-formed to have a longitudinal circumferential curvature generally conforming to the circumferential curvature of the exterior surface 35 of the tire 15, and may be of a length slightly greater than the length of the internal bag. For example, the circumferential length of the external bag might be in the order of 18" while the circumferential length of the internal bag might be approximately 15".

One of the end walls 42 of the external bag 37 also receives a heater element, such as the electrical heater cartridge 44, which may be identical to the cartridge 24. The cartridge 44, extends lengthwise within the space between the walls 38 and 39 of the bag 37, and is surrounded by the hydraulic fluid 40 for heating. The cartridge 44 is connected by an electrical conduit or line 45 to a source of eletrical power, not shown.

In order to hold the inflatable mandrel 27, the internal bag 16, and the external bag 37, in operative position, that is in place for vulcanizing the patch 11 and plug 12, at least one, and preferably a plurality of elongated, flexible, inelastic retainer straps 48 are wrapped radially about the outside of the external bag 37 and the mandrel 27. The ends of the retainer straps 48 are secured together in fixed positions by means of the buckle mechanisms 49, so that the straps 48 tautly engage the exterior surface 39 of the external bag 37 and also extend across the interior wall portion 29 of the inflatable mandrel 27, before the mandrel 27 is fully inflated. After the buckle mechanisms 49 are secured, and compressed air is introduced into the inflatable bag 27, through the hose 32 and the valve 31, the increased air pressure creates a commensurately increased tension in the retainer straps 48. Thus, the mandrel 27 is retained against any further radial inward movement so that the major portion of the expansion of the mandrel 27 occurs in the expansion of the exterior wall portion 28 against the inner wall 17 of the fluid bag 16. Thus, the mandrel 27 transmits its pressure to the hot hydraulic fluid 20 and the outer wall 18 of the internal bag 16. Simultaneously, the tension created within the retainer straps 48 is transmitted to the exterior wall 39 of the external bag 37 exerting pressure upon the heated fluid 40, which in turn, transmits a uniform pressure to the inner wall 38 of the external bag 37 to snugly grip and lie flush against the exterior surface 35 of the tire 15.

Preferably, prior to the inflation of the mandrel 27, energy is supplied through the electrical lines 25 and 45 to the respective heater cartridges 24 and 44 to heat the corresponding hydraulic fluid 20 and 40 within the internal bag 16 and the external bag 37, respectively. Because of the mobility or fluidity of the hydraulic fluid, heat is uniformly transferred throughout the extent of the hydraulic fluid within the respective bags 16 and 37 to create a substantially uniform vulcanizing temperature to both surfaces of the tire 15, as well as to the patch 11.

The curing time for the vulcanization of the patch 11 and plug 12 depends upon many factors known in the art, such as the thickness of the tire 15 at the location of the injury and the patch 11, as well as the type of material incorporated in the wall of the tire.

In a preferred form of the invention, the hydraulic fluid is a heat-conductive hydraulic fluid, such as a silicone fluid, which has a boiling point of 450° F. The boiling point of the hydraulic fluid may vary, so long as it is greater than the normal operating vulcanizing temperature of 270° F. Such vulcanizing temperature may range 220°–300° F., and is more commonly approximately 270° F. One form of hydraulic fluid which has been used successfully is General Electric SF96 350 centistokes silicone fluid.

Also in a preferred form of the apparatus 10, each of the internal fluid pressure bag 16 and external fluid pressure bag 37, is encased in a flexible cover 50 and 51 respectively, and is preferably made of Nylon.

The retainer straps 48 are also preferably made of Nylon.

Although not disclosed in the drawings, when the various elements of the apparatus 10 are assembled upon the tire 15, the tire is supported in an elevated position convenient to the tire repairman. One means of supporting the tire 15 is with a sling supporting the upper portion of the tire from an elevated position. The sling can be supported from a hoist of any convenient type to permit the sling and the tire 15 to be raised and lowered to the desired repair position.

The apparatus 10 could be adapted to be used in combination with an existing tire mold, such as the Vulcan molds, previously discussed. In such event, the retainer straps 48 would be eliminated, and the remaining assembly of the apparatus 10, including the tire 15, could be inserted between the jaws of the mold, so that the external fluid bag 37 would fit within the mold cavities. In this event, the interior wall 29 of the mandrel 27 would be retained by an existing and conventional clamp mechanism of the conventional mold apparatus.

A tire repaired in a mold apparatus incorporating the mandrel 27 and the two fluid bags 16 and 37, would have all the advantages of the uniformly heated hydraulic fluid within these bags and the two-dimensional flexibility of the fluid bag walls.

It is also within the scope of this invention to substitute for the electrical heating cartridges 24 and 44, a fluid circulating system incorporating a pump and lines leading to and from each of the bags 16 and 37, so that the fluid could be heated externally and pumped through external lines to each of the bags 16 and 37 in order to circulate the heated fluid uniformly throughout each of the bags. The heated fluid would then be returned to the heater and the pump through corresponding return lines, not shown.

It is also possible to utilize a conventional electrical heating pad between the mandrel 27 and the fluid bag 16 to heat the hydraulic fluid 20.

Furthermore, a conventional heated, but non-inflatable, mandrel might be substituted for the mandrel 27, in order to heat the hydraulic fluid 20.

In a preferred form of the invention, the walls of the respective fluid bags 16 and 37 are made from a heat-resistant rubber to provide the two-dimensional flexibility and long service life.

Furthermore, when the apparatus 10, made in accordance with this invention, is utilized, it is immaterial what type of repair material is used to fill and cover the injury hole, so long as the material is unvulcanized rubber, and requires vulcanization to complete the repair process. For example, any unvulcanized rubber filler material might be used in the injury hole instead of the plug 12.

Because of the flexibility of the bags, the apparatus 10 may be utilized on various types and sizes of tires. For example, one apparatus 10 might be used on truck tires having a width of 8.25 to 12.00".

Also in a preferred form of the invention, any operating pressure may be used which is sufficient to vulcanize the particular patch on the particular tire. Although Michelin recommends a minimum of 15 psi, the operating pressure which would normally be used with the apparatus 10 would be approximately 30 psi.

When the fluid bags 16 and 37 do not extend transversely entirely from bead-to-bead, around the respective sidewalls, shoulders and tread areas, as disclosed in the drawings, the major portion of each fluid bag is placed on the side of the tire 15 in which the tire patch 11 is located. Thus, the particular dimensions, that is the radial and circumferential dimensions of the respective bags 16 and 37 are not critical, so long as they give maximum coverage and thermal exposure to the repair patch 11 and the surrounding areas on both the interior and exterior surfaces of the tire wall 15 to effect vulcanization.

It is also evident from the description of the structure and function of the above apparatus 10, that the elements employed for the vulcanization of the tire repair materials, are not only minimal in number, but minimal in size, and therefore require minimal space for effecting the tire repair as well as for storing the tire repair equipment.

Furthermore, the apparatus 10 made in accordance with this invention is particularly adapted for use in the field for repairing tires of various sizes at the site of the puncture or tire injury. The only external equipment needed for the repair of a tire with the apparatus 10, is some mechanism for suspending or supporting the tire 15 while it is being repaired, such as the previously described sling, a source of compressed air to which the hose 32 may be attached, and a source of electricity for the heater cartridges 24 and 44, or an equivalent heating system. Therefore, because of the minimal number of elements in the apparatus 10 as well as the minimum amount of apparatus required, the tire may be easily and rapidly repaired without the necessity of transmitting the tire to a repair shop or site.

Because of the uniformity of pressure and temperature and the continuity of the flush engagement between the fluid bags 16 and 37 and the respective interior surface 21 and exterior surface 35 of the tire 15, a complete vulcanized repair of the injured area is assured.

What is claimed is:

1. A method for vulcanizing a repair patch on an injured area in the surface of a tire comprising the steps of:
    (a) applying a repair patch of unvulcanized rubber upon the injured area in the surface of a tire to be repaired,
    (b) placing a fluid pressure bag, containing a heat-conductive hydraulic fluid having a predetermined boiling point, flush against said rubber repair patch and the surrounding surface of a tire to be repaired, (c) heating said hydraulic fluid to an operating vulcanizing temperature less than said boiling point, (d) placing a mandrel within the tire to be repaired and in general radial alignment with the repair watch, (e) applying pressure to said mandrel, and (f) transferring said pressure to, and against, the opposite side of the fluid pressure bag from the tire surface to increase the pressure of the heated hydraulic fluid against the repair patch and vulcanize the unvulcanized rubber repair patch.

2. The method according to claim 1 in which said step of placing said fluid pressure bag comprises placing said bag within the tire and against the interior surface of said tire, and said step of placing said mandrel comprises placing said mandrel against the opposite side of said bag from said interior surface.

3. The method according to claim 2 in which said step of transferring said pressure comprises restraining said mandrel within the tire to be repaired against movement radially inward of the tire, to force said mandrel against said opposite side of said bag.

4. The method according to claim 3 in which said fluid pressure bag is an internal fluid pressure bag, and further comprising the step of placing an external fluid pressure bag, containing a heat-conductive hydraulic fluid having a predetermined boiling point, flush against the exterior surface of the tire radially opposing said internal fluid pressure bag so that said repair patch is between said fluid pressure bags, heating said hydraulic fluid in said external bag to an operating vulcanizing temperature less than said boiling point, and retaining said external fluid pressure bag against the exterior surface of the tire to be repaired.

5. The method according to claim 4 in which said step of transferring said pressure to said internal fluid bag and said step of retaining said external fluid bag against the tire comprises encircling said external fluid bag and said mandrel with at least one inelastic retainer strap, and securing said retainer strap in a loop radially around and engaging said external fluid pressure bag and said mandrel so that the pressure exerted by said mandrel is transmitted to said internal fluid pressure bag and said external fluid pressure bag against said corresponding interior and exterior surfaces of the tire to be repaired.

6. The method according to claim 5 in which said hydraulic fluid is a silicone hydraulic fluid.

7. The method according to claim 5 in which the walls of said internal and external fluid pressure bags have two-dimensional flexibility.

* * * * *